US007653248B1

(12) United States Patent
Witzgall et al.

(10) Patent No.: US 7,653,248 B1
(45) Date of Patent: Jan. 26, 2010

(54) COMPRESSION FOR HOLOGRAPHIC DATA AND IMAGERY

(75) Inventors: Hanna Elizabeth Witzgall, Chantilly, VA (US); Jay Scott Goldstein, Centerville, VA (US)

(73) Assignee: Science Applications International Corporation, San Diego, CA (US)

( * ) Notice: Subject to any disclaimer, the term of this patent is extended or adjusted under 35 U.S.C. 154(b) by 704 days.

(21) Appl. No.: 11/267,177

(22) Filed: Nov. 7, 2005

(51) Int. Cl.
*G06K 9/76* (2006.01)
*G06K 9/36* (2006.01)
*G06K 9/46* (2006.01)

(52) U.S. Cl. .................. 382/210; 382/276; 382/232

(58) Field of Classification Search .......... 382/154, 382/210, 232, 233, 248, 272, 276, 280, 284; 375/240.02, 240.16, E7.105, E7.109; 348/416.1, 348/699; 359/1, 9, 22; 345/419; 235/457, 235/462.01
See application file for complete search history.

(56) References Cited

U.S. PATENT DOCUMENTS

| | | | | |
|---|---|---|---|---|
| 4,516,259 A | * | 5/1985 | Yato et al. ............... | 704/220 |
| 4,801,939 A | | 1/1989 | Jones ...................... | 342/25 |
| 6,157,677 A | * | 12/2000 | Martens et al. ........ | 375/240.16 |
| 6,246,796 B1 | * | 6/2001 | Horikoshi et al. ........ | 382/232 |
| 6,456,405 B2 | * | 9/2002 | Horikoshi et al. ........ | 359/9 |
| 6,697,316 B2 | * | 2/2004 | Burr ........................ | 369/103 |
| 6,714,154 B2 | * | 3/2004 | Cirillo et al. .............. | 342/25 R |
| 6,739,511 B2 | * | 5/2004 | Tsikos et al. .......... | 235/462.01 |
| 6,803,928 B2 | * | 10/2004 | Bimber et al. ............ | 715/757 |
| 7,136,010 B2 | | 11/2006 | Cirillo et al. ............. | 342/25 R |
| 7,391,911 B2 | * | 6/2008 | Hwang ..................... | 382/232 |
| 2002/0136294 A1 | * | 9/2002 | Culbert ................. | 375/240.02 |

OTHER PUBLICATIONS

Witzgall, Hanna E., et al., "Exploiting Fundamental Properties of SAR Data for Compression of Tactical SAR Imagery," *Proc. of 26th IEEE Aerospace Conference*, Big Sky, MT, Mar. 2005, 9 pp.

(Continued)

*Primary Examiner*—Amir Alavi
(74) *Attorney, Agent, or Firm*—King & Spalding LLP

(57) ABSTRACT

Image pixel intensity data is transformed to a holographic representation of the image. A subset of the holographic representation is modeled. Model parameters constitute a compressed image representation. A two-dimensional Fourier transform can be applied to obtain the holographic image. Modeling includes applying an analysis portion of an adaptive analysis/synthesis prediction methodology to a subset of the holographic representation. Linear prediction can be the adaptive analysis/synthesis prediction methodology. Prior to modeling, one-dimensional Fourier transform can be performed on the holographic representation and the linear prediction is one-dimensional. Model parameters are preferably quantized. Embodiments include determining error between the model and the model's input data. There the compressed image representation the error, which also can be quantized. The subset of the holographic representation can be less than all the representation. The subset can be a plurality of complete rows; preferably substantially symmetric about 0 Hz.

48 Claims, 4 Drawing Sheets

OTHER PUBLICATIONS

Witzgall, Hanna E., et al., "Compression of Tactical Real-Valued SAR Imagery in the Complex SAR Phase History Domain," *Proc. 38th Asilomar Conference Signals, Syst. Comput.*, Pacific Grove, California, Nov. 2004, 4 pp.

Soong, Frank K., et al., "Optimal Quantization of LSP Parameters," *IEEE Transactions on Speech and Audio Processing*, vol. 1, No. 1, pp. 15-24, Jan. 1993.

Paliwal, Kuldip K., et al., "Efficient Vector Quantization of LPC Parameters at 24 Bits/Frame," *IEEE Transactions on Speech and Audio Processing*, vol. 1, No. 1, pp. 3-14, Jan. 1993.

Sayood, Khalid, "Introduction to Data Compression," Morgan Kaufmann Publishers, Inc., San Francisco, California, Copyright 1996 (Copy of Cover, Copyright Page, and Table of Contents), 8 pp.

Hayes, Monson H., "Statistical Digital Signal Processing and Modeling," John Wiley & Sons, Inc., New York, New York, Copyright 1996 (Cover, Copyright Page, and Table of Contents), 7 pp.

File History for Application filed on Sep. 14, 2007, Titled: "Magnitude Image Compression".

Witzgall, Hanna E., "Parametric Modeling of Detected SAR Imagery for Compression," *IEEE*, 6 pp., Copyright 2007.

Witzgall, Hanna E., et al., "Detection Performance of the Reduced-Rank Linear Predictor Rocket," *IEEE Transactions on Signal Processing*, vol. 51, No. 7, Jul. 2003, pp. 1731-1738.

Eichel, Paul, et al., "Compression of Complex-Valued SAR Images," *IEEE Transactions on Image Processing*, vol. 8, No. 10, Oct. 1999, pp. 1483-1487.

\* cited by examiner

COMPRESSION FOR HOLOGRAPHIC DATA AND IMAGERY

STATEMENT REGARDING FEDERALLY SPONSORED RESEARCH OR DEVELOPMENT

Embodiments of the invention disclosed herein may have been conceived or first actually reduced to practice in the performance of work under the Government contracts. As a result, the Government may have certain rights in these inventions.

FIELD OF THE INVENTION

Embodiments of the invention disclosed herein relate to data compression. More specifically, some embodiments relate to compression of image data.

BACKGROUND OF THE INVENTION

Existing image compression algorithms, either lossy or lossless, operate on the real-valued pixel intensities of the image. As a basis for compression, most of the techniques attempt to exploit local correlations among data elements, e.g., pixel intensities. For example, many lossless compression algorithms for imagery seek to capture the local correlation among pixel intensities using very low order pre-determined linear filters. The error residual output of the filters are then encoded and transmitted to the receiver. Longer prediction filters are not helpful for compressing image pixel intensity data since the correlations are localized.

The transform coding used in JPEG is the most popular approach for lossy image compression. It also tries to capture the local correlations in image intensities by dividing the figure into small 8×8 blocks of data. These localized blocks are transformed using a two-dimensional Discrete Cosine Transform (DCT) and the largest transform coefficients are retained and encoded for transmission. JPEG 2000 is an recent image compression standard based on a wavelet approach that uses sub-banding to decompose the image into low-pass and high-pass regions. The outputs of the filter banks are down-sampled, quantized, and encoded. The decoder decodes the coded representations, up-samples and reconstructs the signal using a synthesis filter bank. In JPEG 2000 the filter banks are predetermined and are independent of the source data. The information necessary to reconstruct the image comes from transmitting selected outputs of the analysis filters.

BRIEF SUMMARY OF THE INVENTION

The invention includes method, systems, and computer program products for image compression. Various embodiments of the invention include steps, modules and subsystems for performing the following activities. Pixel intensity data of an image is transformed to a holographic representation of the image. A subset of the holographic representation is modeled. The model parameters constituting a compressed representation of the image.

In some embodiments, a two-dimensional Fourier transform is applied to obtain the holographic image. Modeling includes applying an analysis portion of an adaptive analysis/synthesis prediction methodology to a subset of the holographic representation. Linear prediction is a preferred as the adaptive analysis/synthesis prediction methodology. In some embodiments, prior to modeling, a one-dimensional Fourier transform is performed on the holographic representation and the linear prediction is one-dimensional.

In some embodiments model parameters are quantized. Some embodiments include determining an error between the model and the input data to the model. In those embodiments, the compressed representation of the image includes the error, which is also quantized.

Optionally, the subset of the holographic representation can be less than all the holographic representation. For example, in some embodiments subset is a plurality of complete rows. Preferably, where the transform is to a frequency domain, the subset is chosen to be substantially symmetric about 0 Hz.

Other embodiments of the invention include methods, systems, and computer program products for communicating images. In addition to the activities described above, these embodiments involve communicating the model parameters to a destination. At the destination a holographic representation is synthesized from the model. The synthesized holographic representation is transformed to a set of pixel intensity data of the image. In some embodiments, the destination and source are co-located. In some embodiments, the synthesized holographic representation is created using the error as an excitation source. In other embodiments the synthesized holographic representation is created using white noise as an excitation source. In still further embodiments the final image is formed by averaging the results of a plurality of reconstituted images, each based on an independent excitation using white noise. In still further embodiments, the decompression steps are performed at a destination other than the computer platform where compression is performed.

BRIEF DESCRIPTION OF THE SEVERAL VIEWS OF THE DRAWING

Other objects, features, and advantages of the present invention will become more apparent from the following detailed description of the preferred embodiment and certain modifications thereof when taken together with the accompanying drawings in which.

DETAILED DESCRIPTION OF THE INVENTION

Figure 1:
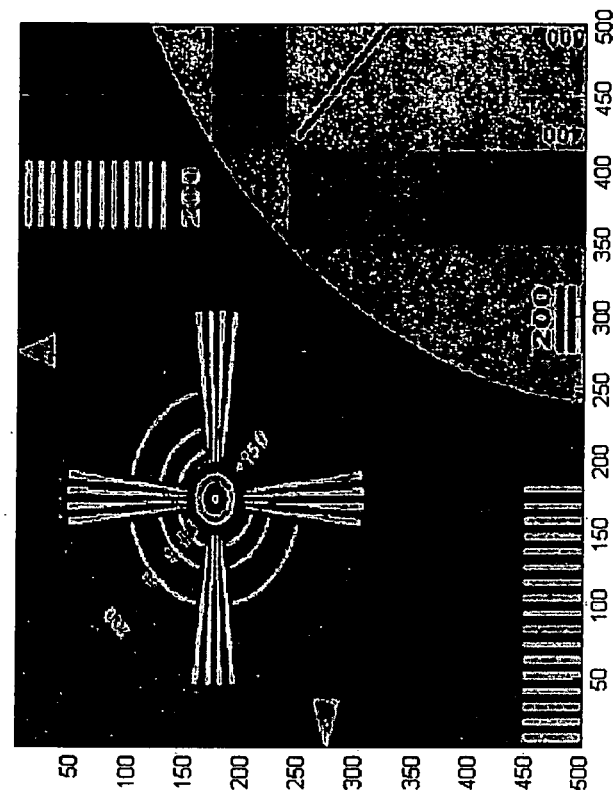
FIG. 1 illustrates an original image and an image reconstructed after being compressed in accordance with embodiments of the invention.
Figure 1:
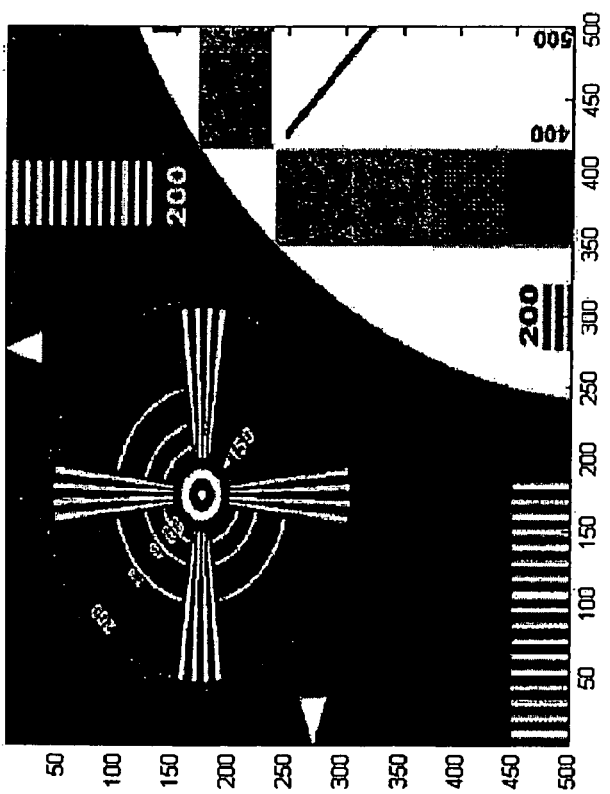

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Embodiments of the present invention employ adaptive analysis/synthesis techniques typically used for compression of speech data. Such compression techniques generally achieve very high compression ratios if there is a valid parametric model of the data source, since the techniques typically require that only the model parameters be transmitted for reconstruction of the original data. Although successful for speech compression, adaptive analysis/synthesis techniques have not been successfully employed before for image compression. One reason that typical image compression techniques do not rely on an adaptive model-based analysis/synthesis architecture is because it is generally believed that while speech can be modeled as the output of a linear filter, most images cannot. Thus the absence of strong global correlations in the pixel intensities across an image discourages use of adaptive analysis/synthesis compression architectures that rely on the availability of stationary data to train a parametric model of the source.

Embodiments of the invention create a representation of imagery data that allows an image to be modeled using an adaptive analysis/synthesis compression architecture. Some embodiments of the invention first transform the image data (e.g., pixel intensities) into a representation that replaces local correlations in pixel intensities with global correlations in a wave format that remains mathematically stationary throughout the transformed data. This allows a useful formation of model parameters based on a relatively large collection of training data with substantially the same statistics. Additionally, stationarity allows the modeled image data to be synthesized (e.g., reconstructed at a destination) using only one set of model parameters that capture the stationary data statistics. Thus the data transformation to this substantially globally-correlated representation enables an analysis/synthesis compression architecture for imagery.

The present disclosure refers to the transformed pixel intensity data as the image's "holographic representation" since it exhibits holographic properties in the sense that all regions of the transform contain the spatial frequencies present throughout the image—similar to the way an optical hologram contains all spatial frequencies present in the imaged object. Typically, the holographic representation is achieved by applying a two-dimensional Fast Fourier Transform (2-D FFT) to the pixel intensities of the image. This transforms pixel amplitudes into a complex 2-D plane wave whose frequencies in the horizontal and vertical directions corresponds to the horizontal and vertical positions of the pixel. Thus the 2-D FFT transform uncovers a natural wave structure underlying the image. In this representation the data are statistically stationary since the localized pixel energy has now been spread across the entire data representation in the form of a 2-D plane wave. The pixel frequencies are plane waves adding constructively and destructively in the holographic representation. The presence of the complex wave forms at each point in the transformed domain means that the transformed data can be effectively modeled with adaptive linear filter techniques, such as Linear Predictive Coding (LPC).

Once the transformed data have been modeled, the model parameters are quantized, encoded, and transmitted to a receiver (or stored locally) for future reconstruction and viewing. The image is reconstructed by decoding the model parameters and synthesizing the holographic data in a manner similar to many of the ways that speech is synthesized in methods such as vocoding. The data synthesis can take the form of passing a random Gaussian noise signal through a filter loaded with the model parameters to regenerate an approximation of the original holographic representation. The synthesized holographic data will have the same dominant frequencies as the original data, but (in this embodiment) will have different phase relationships. From there, the synthesized holographic representation is transformed into an approximation of the original image data. This approach is especially advantageous to high compression ratios since it requires that only the quantized model parameters be transmitted to the receiver to synthesize the image. FIG. 1 provides an example of an original image 110 and a reconstructed image 120 synthesized using only the linear model parameters of the original image and a Gaussian noise excitation signal.

The compression of an image may be further increased with only gradual degradation in the reconstructed image by taking advantage of another property of the holographic representation. Since the holographic domain is composed of the 2-D plane waves of the pixel values, the pixel values are represented in all portions of the holographic data. This means that only portions of the holographic data actually need to be modeled and encoded. The effect of selecting only a portion of the holographic data to model results in a lower resolution reconstructed image; however the image degradation is gradual when compared to the increase in compression. One difference between embodiments of the present invention and typical speech processing is that speech waveform data does not have the holographic property of the transformed image data. In other words, speech compression cannot selectively omit certain regions of its data and still recreate a close representation of the original signal.

Another distinction between speech processing and embodiments of the present invention is that phase information present in voiced speech, while not essential to speech understanding, is critical to speaker recognition. In other words, sending white noise through the adaptive filters recovers the frequency content of the speech but loses the phase information, creating a very robotic sounding speech. In image synthesis the viewed image is the 2-D spectrum of the pixel waveforms formed from the absolute magnitude of the complex imagery. Thus the underlying phase information in the synthesized image is nowhere observed in the reconstructed imagery. This makes the random noise synthesized approach even better suited for image reconstruction than for speech compression since the loss of phase content is substantially irrelevant to image visual quality.

Figure 2:
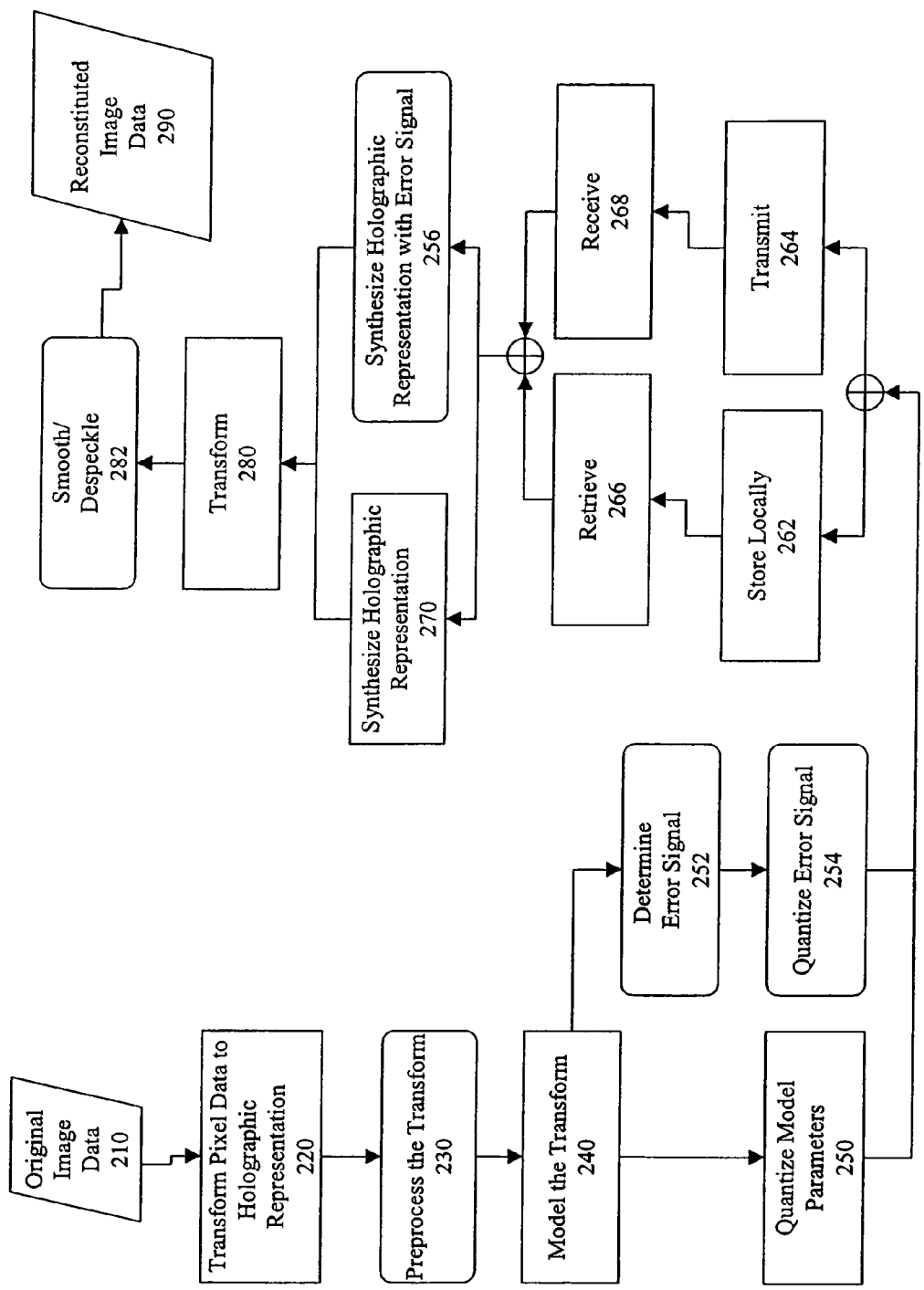
FIG. 2 illustrates methods of the invention.

Subsequent paragraphs provide detailed description of various embodiments of the invention. FIG. 2 provides an overview of the method illustrating, among other things:

- transforming 220 original image data 210 into a holographic representation amenable to modeling;
- pre-processing the holographic representation in some cases, e.g., select a portion of the holographic representation, perform DFT on columns 230;
- modeling the holographic representation or its preprocessed form 240;
- quantizing the model parameters 250;
- creating a synthesized holographic representation from model parameters 270;
- transforming 280 the synthesized holographic representation into a reconstituted image 290;
- optionally making the above process lossless by determining an error signal between a representation locally reconstituted from the model and the original representation 252, quantizing the error signal 254, and using it, to synthesize 256 the holographic (or hybrid) representation to form a lossless image of the original at the destination; and
- optionally smoothing/despeckling the reconstituted image 282.

Figure 3:
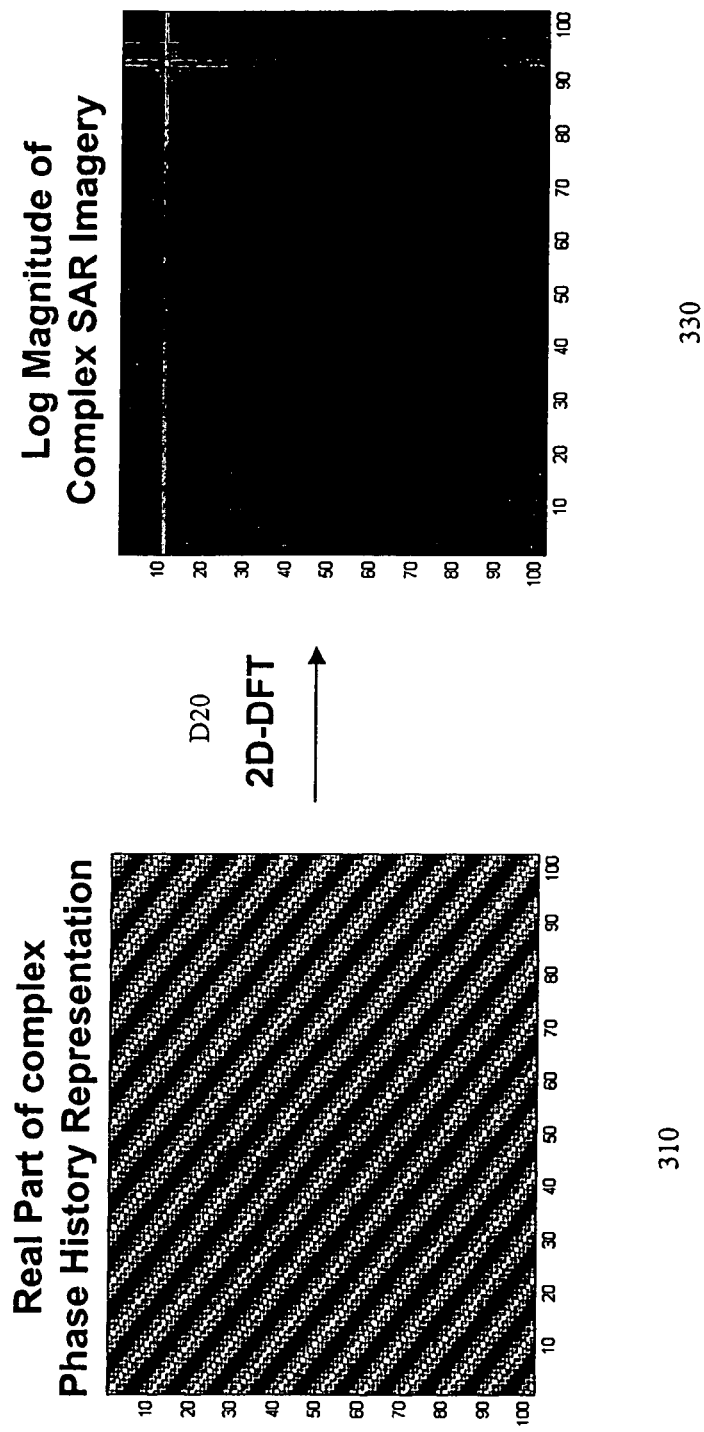
FIG. 3 illustrates a relationship between a holographic representation (analogous to a radar phase history) of image data and a viewable image.

Embodiments of the invention have applicability to Synthetic Aperture Radar (SAR) image compression. SAR is a remote sensing technology that synthesizes an antenna aperture using the motion of a radar transmitter to yield high spatial resolution radar images. Referring to FIG. 3, in SAR technology the temporal wave nature of radar returns is represented by a phase history 310 (analogous to the holographic representation of the present invention). Applying a 2D Discrete Fourier Transform (DFT) 320 to the phase history forms a complex imagery array. The magnitude of elements in the complex imagery array is used to form a viewable SAR image 330. Thus, a viewable SAR image is formed from the 2D spectrum of its phase history representation.

Figure 4:
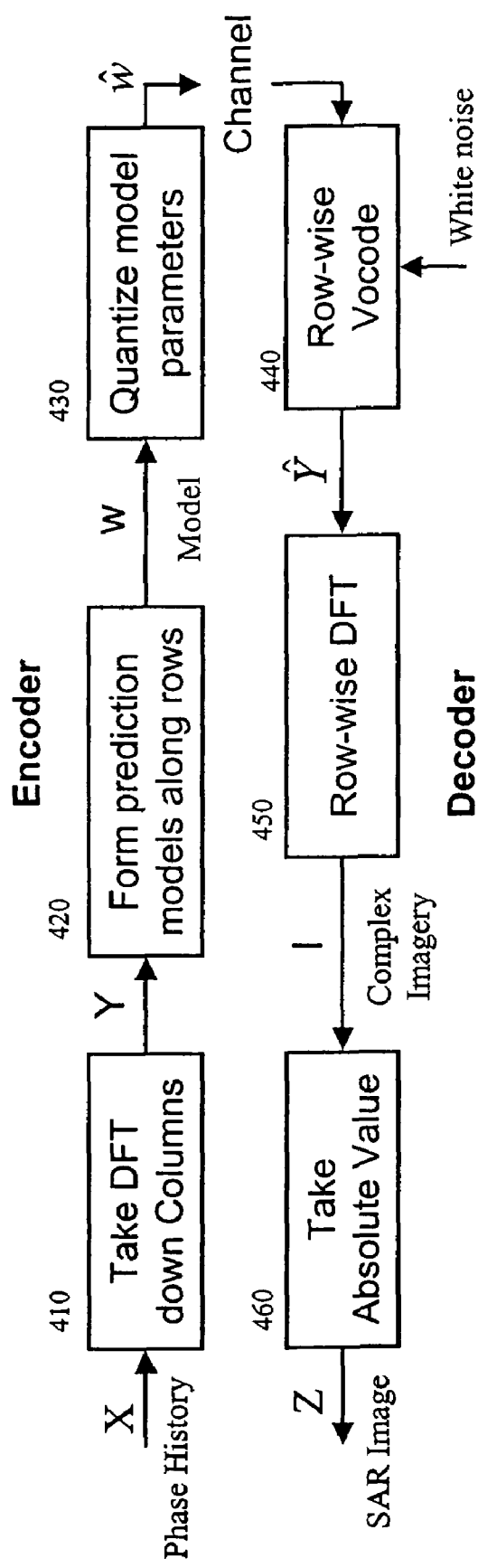
FIG. 4 illustrates methods of the invention as applied to Synthetic Aperture Radar data.

Since the phase history representation of a SAR image is both mathematically stationary and largely composed of correlated exponentials, methods of the present invention can be used to advantage for compressing the image based on the phase history representation. FIG. 4 illustrates the combination of DFTs with analysis/synthesis modeling to implement a method of the invention.

First, a DFT is applied 410 to each column of the 2D phase history of an image. While applying a DFT is not necessary for transforming the phase history into an holographic representation (the phase history is already a holographic representation), this sub-banding approach de-correlates the 2D complex exponentials of the phase history into rows of 1D complex exponentials, eliminating the need to model 2D statistics. In some embodiments, the 2D holographic representation is directly modeled with a column-wise DFT.

The models for each row are formed using standard linear prediction 420, which is an effective technique for finding models of stationary correlated data sets. The modeler uses weighted linear combination of previous signal values to model the current value. Weight coefficients, w, are found using the normal equations that find the expected correlations between past and current values for stationary sources. A covariance matrix of these coefficients with Toeplitz symmetry is formed by zero padding. This symmetry allows a computationally efficient solution to w, e.g., using the popular Levinson-Durbin recursion. In other embodiments, adaptive analysis/synthesis approaches to modeling that are known to those skilled in the art may be used in place of Linear Prediction Coding. The coefficients are then quantized 430.

Since linear predictive coefficients are known to be sensitive to quantization effects, quantization in the present embodiments is preferably performed on an alternate representation of the coefficients known as line spectral pairs (LSP). While this representation relates one parameter, w, to a pair (symmetric and anti-symmetric) of polynomials, the roots of each polynomial come in predictable pairs so that there is still the same number of coefficients to quantize. For example each positive frequency has its negative counterpart and the magnitudes are reflected in pairs around a unit circle. Therefore, by quantizing half the roots of both polynomials, all the model parameters are present.

Given that there is a strong correlation between LSP parameters from row to row, trellis coded quantization (TCQ) is applied 430 to the difference between the LSP parameters of each row. TCQ uses a Viterbi algorithm to select the path, through a state machine, that causes the least amount of quantization distortion. The branches of the state machine refer to specific quantization levels. For illustration, four states can be used with two branches going in and out of each state, for a total of eight quantization levels. Other quantization methods know to those skilled in the art, e.g., uniform, scalar, vector, Huffman, arithmetic, vector codebook, quantization, split matrix, can be used in place of TCQ.

Quantized model parameters, $\hat{w}$, represent a compressed representation of the original image. Among other things, this compressed representation can be stored for later retrieval within the system that compressed the image, written to removable memory for transfer to another location or archive, and transmitted over a communications medium to a receiver at a destination.

At the destination, or upon retrieval from a storage medium, the weights are loaded into the synthesis portion of a prediction model used to analyze the weights in the first place. Row data $\hat{Y}$ is synthesized by passing white noise through the loaded prediction model 440. This aspect of the invention is similar to vocoding used in speech compression. While this process destroys the original phase relationship, since phase is discarded when the real-valued SAR image is formed, discarding phase does not affect output image quality.

In some embodiments, the quality of the final viewable image can be improved (smoothed/despeckled) with no additional transmitted information by passing multiple noise sequences through the loaded prediction model and then averaging the outputs $\hat{Y}$. This approach largely despeckles the reconstituted image without the typical associated loss in resolution common to many smoothing algorithms. Smoothing can also be accomplished through use of an adaptive filter such as a Wiener filter.

A DFT then operates 450 on each reconstructed row to transform the data into the reconstituted complex image. The viewable reconstituted image is created 460 from the absolute value of the reconstituted complex image. A slight loss in resolution can occur due to the sliding window snapshot process. In this fashion, embodiments of the invention combine the efficiency of model-based compression with a vocoding reconstruction technique to achieve compression gain with acceptable loss viewable image quality.

Not all of the holographic representation needs to be used in order to produce a model that will result in a good approximation of the original image. Since the dominant frequencies are found throughout the holographic representation, those can be captured in smaller segments (e.g., fewer rows or fewer columns) of the holographic representation. The synthesized holographic representation can be zero-padded so that the transform back to complex imagery is the same size as the original image. Thus the holographic representation can be used to further compress the image at a cost of decreased resolution. In preferred embodiments, the portion of the holographic representation chosen to be modeled is symmetric about 0 Hz.

In a variation on the above description, the holographic representation synthesized from the model parameters can be based on a quantized error residual rather than a Gaussian white noise excitation source. As another alternative, Code Excited Linear Predication (CELP) can be used to approximate the error residual.

Embodiments of the invention also can applied to lossless compression. Lossless compression typically incorporates a data model, such as LPC described above, to reduce the estimated entropy of the signal. By transmitting both the model parameters and the error residual formed between the model's estimate and the original signal, the original image can be losslessly reconstructed. If the error residual has a lower dynamic range or entropy, a lossless compression gain is achieved. In general, the similarity between filter coefficients of adjacent rows should be utilized in the quantization method chosen.

While SAR applications (where a holographic representation of an image is typically available as its phase history) were presented as an illustrative embodiment, any set of pixel intensity data that can be 2-D transformed into a holographic representation can be modeled directly by methods such as 2-D Linear Prediction, Hidden Markov models, and other adaptive analysis/synthesis statistical modeling technique known to those skilled in the art.

The above-described system can be implemented on a computing device, such as a personal computer, Personal Digital Assistant (PDA), internet enabled telephone, dedicated image compression/decompression device, or the like, or a separate programmed general purpose computer having a image management capabilities. Additionally, the systems and methods of this invention can be implemented on a special purpose computer, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a state machine that is in turn capable of implementing the processes described herein can be used to implement the systems and techniques according to this invention.

While the embodiments illustrated herein show the various components of the system co-located, it is to be appreciated that the various components of the system can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the following description, and for reasons of computational efficiency, the components of the system can be arranged at any location within a distributed network without affecting the operation of the system. Moreover, the components could be embedded in a dedicated image encoding and/or decoding machine.

Furthermore, it should be appreciated that the various links, including the channel, connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Furthermore, the disclosed methods may readily be implemented in software using object or object-oriented software development environments that provide portable source code that can be used on a variety of computer or workstation platforms. Alternatively, the disclosed system may be implemented partially or fully in hardware using standard logic circuits or, for example, a VLSI design. Whether software or hardware is used to implement the systems in accordance with this invention is dependent on the speed and/or efficiency requirements of the system, particular function, and the particular software or hardware systems or microprocessor or microcomputer systems being utilized. The systems and methods illustrated herein can be readily implemented in hardware and/or software using any suitable systems or structures, devices and/or software, such as JAVA®, by those of ordinary skill in the applicable art from the functional description provided herein and with a basic general knowledge of the computer and data or image processing arts.

Moreover, the disclosed methods may be readily implemented in software, e.g., as a computer program product, executed on a programmed general purpose computer, a special purpose computer, a microprocessor, or the like. In these instances, the systems and methods of this invention can be implemented as a program embedded on a personal computer such as a JAVA®, CGI or Perl script, as a resource resigning on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture. While exemplary embodiments disclosed herein use still imagery to enable principles of the invention, these principles can also be applied to, e.g., video, medical imagining, transmission of images to wireless devices.

We claim:

1. A method of communicating images, the method comprising:
at a source:
transforming pixel intensity data of an image to a holographic representation of the image by applying a Fourier transform, and
modeling a subset of the holographic representation;
communicating the model parameters to a destination; and
at the destination:
synthesizing a holographic representation from the model without phase information, and
transforming the synthesized holographic representation to a set of pixel intensity data of the image.

2. The method of claim 1 wherein:
transforming comprises applying a two-dimensional Fourier transform.

3. The method of claim 1 wherein:
modeling comprises applying an analysis portion of an adaptive analysis/synthesis prediction methodology to a subset of the holographic representation.

4. The method of claim 3 wherein:
the adaptive analysis/synthesis prediction methodology comprises linear prediction.

5. The method of claim 1 further comprising, quantizing the model parameters.

6. The method of claim 1 wherein the subset of the holographic representation is less than all the holographic representation.

7. The method of claim 6 wherein the subset comprises a plurality of complete rows of the holographic representation.

8. The method of claim 6 wherein the transform is to a frequency domain and the subset is chosen to be substantially symmetric about 0 Hz.

9. The method of claim 1 wherein the destination and source are co-located.

10. The method of claim 1 wherein synthesizing comprises use of white noise as an excitation source.

11. The method of claim 10 wherein synthesizing further comprises averaging the results of a plurality of reconstituted images, each based on an independent excitation using white noise.

12. A method of communicating images, the method comprising:
at a source:
transforming pixel intensity data of an image to a holographic representation of the image by applying a Fourier transform, and
modeling a subset of the holographic representation;
communicating the model parameters to a destination; and
at the destination:

synthesizing a holographic representation from the model without phase information, and transforming the synthesized holographic representation to a set of pixel intensity data of the image;

further comprising, determining an error between the model and the original image;

whereby the compressed representation of the image additionally comprises the error.

13. The method of claim 12 further comprising, quantizing the error.

14. A method of communicating images, the method comprising:

at a source:
transforming pixel intensity data of an image to a holographic representation of the image by applying a Fourier transform, and
modeling a subset of the holographic representation;
determining the error between the model and the original image;
communicating the error to the destination;
communicating the model parameters to a destination; and at the destination:
synthesizing a holographic representation from the model without phase information; and
transforming the synthesized holographic representation to a set of pixel intensity data of the image; and
synthesizing further comprises use of the error as an excitation source.

15. A method of decompressing a compressed representation of an image, the method comprising:
receiving a compressed representation of an image, the compressed representation comprising parameters of a model of the image; transforming pixel intensity data of an image to a holographic representation of the image by applying a Fourier transform
synthesizing a holographic representation of the image from the model without phase information, and
transforming the synthesized holographic representation to at least a set of pixel intensity data of the image.

16. The method of claim 15 wherein:
transforming comprises applying a two-dimensional Fourier transform.

17. The method of claim 16 wherein:
the adaptive analysis/synthesis prediction methodology comprises linear prediction.

18. The method of claim 16 wherein the transform is to a frequency domain and the subset is chosen to be substantially symmetric about 0 Hz.

19. The method of claim 15 wherein:
the model is the product of the analysis portion of an adaptive analysis/synthesis methodology and the input to the model is a subset of a holographic representation of the image.

20. The method of claim 15 wherein the subset of the holographic representation is less than all the holographic representation.

21. The method of claim 20 wherein the subset comprises a plurality of complete rows of the holographic representation.

22. The method of claim 15 wherein synthesizing comprises use of white noise as an excitation source.

23. The method of claim 22 wherein synthesizing further comprises averaging the results of a plurality of reconstituted images, each based on an independent excitation using white noise.

24. A method of decompressing a compressed representation of an image, the method comprising:

receiving a compressed representation of an image, the compressed representation comprising parameters of a model of the image; transforming pixel intensity data of an image to a holographic representation of the image by applying a Fourier transform
synthesizing a holographic representation of the image from the model without phase information, and
transforming the synthesized holographic representation to at least a set of pixel intensity data of the image;
wherein:
the compressed representation further comprises an error between the model and the input data to the model; and
synthesizing further comprises use of the error as an excitation source.

25. A computer program product comprising a computer readable medium having a computer readable program code embodied therein, the computer readable program code adapted to be executed to implement a method for communicating images, the method comprising:
providing a system having a source and a destination;
transforming, at a transform module at the source, pixel intensity data of an image to a holographic representation of the image by applying a Fourier transform;
modeling, at a modeling module at the source, a subset of the holographic representation, and whereby the model parameters constitute a compressed representation of the image; and
synthesizing, at a synthesis module at the destination, a holographic representation from the model without phase information, and transforming the synthesized holographic representation to a set of pixel intensity data of the image.

26. The method of claim 25 wherein:
transforming comprises applying a two-dimensional Fourier transform.

27. The method of claim 26 wherein:
the adaptive analysis/synthesis prediction methodology comprises linear prediction.

28. The method of claim 25 wherein:
modeling comprises applying an analysis portion of an adaptive analysis/synthesis prediction methodology to a subset of the holographic representation.

29. The method of claim 25 further comprising,
at the source, a quantization module:
residing on at least one of the media, and
operable for quantizing the model parameters.

30. The method of claim 25 wherein the subset of the holographic representation is less than all the holographic representation.

31. The method of claim 30 wherein the subset comprises a plurality of complete rows of the holographic representation.

32. The method of claim 30 wherein the transform is to a frequency domain and the subset is chosen to be substantially symmetric about 0 Hz.

33. The method of claim 25 wherein the destination and source are co-located.

34. The method of claim 25 wherein synthesizing comprises use of white noise as an excitation source.

35. The method of claim 34 wherein synthesizing further comprises averaging the results of a plurality of reconstituted images, each based on an independent excitation using white noise.

36. A computer program product comprising a computer readable medium having a computer readable program code embodied therein, the computer readable program code adapted to be executed to implement a method for communicating images the method comprising:

providing a system having a source and a destination;

transforming, at a transform module at the source, pixel intensity data of an image to a holographic representation of the image by applying a Fourier transform;

modeling, at a modeling module at the source, a subset of the holographic representation and whereby the model parameters constitute a compressed representation of the image;

determining, by the modeling module, an error between the model and the original image;

whereby the compressed representation of the image additionally comprises the error; and synthesizing, at a synthesis module at the destination, a holographic representation from the model without phase information, and transforming the synthesized holographic representation to a set of pixel intensity data of the image.

37. A computer program product comprising a computer readable medium having a computer readable program code embodied therein, the computer readable program code adapted to be executed to implement a method for communicating images, the method comprising:

providing a system having a source and a destination;

transforming, at a transform module at the source, pixel intensity data of an image to a holographic representation of the image by applying a Fourier transform;

modeling, at a modeling module at the source, a subset of the holographic representation, and whereby the model parameters constitute a compressed representation of the image;

quantizing, at a quantization module at the source, the model parameters and the error; and synthesizing, at a synthesis module at the destination, a holographic representation from the model without phase information, and transforming the synthesized holographic representation to a set of pixel intensity data of the image.

38. A computer program product comprising a computer readable medium having a computer readable program code embodied therein, the computer readable program code adapted to be executed to implement a method for communicating images, the method comprising:

providing a system having a source and a destination;

transforming at a transform module at the source, pixel intensity data of an image to a holographic representation of the image by applying a Fourier transform;

modeling, at a modeling module at the source, a subset of the holographic representation and whereby the model parameters constitute a compressed representation of the image;

synthesizing at a synthesis module at the destination, a holographic representation from the model without phase information, and transforming the synthesized holographic representation to a set of pixel intensity data of the image;

determining, by the modeling module, an error between the model and the original image;

whereby the compressed representation of the image additionally comprises the error; and synthesizing further comprises use of the error as an excitation source.

39. A computer program product, comprising a computer readable medium having a computer readable program code embodied therein, the computer readable program code adapted to be executed to implement a method for decompressing a compressed representation of an image, the compressed representation comprising parameters of a model of the image, the method comprising:

providing a system comprising a synthesis module; transforming pixel intensity data of an image to a holographic representation of the image by applying a Fourier transform synthesizing, by the synthesis module, a holographic representation of the image from the model without phase information, and transforming the synthesized holographic representation to at least a set of pixel intensity data of the image.

40. The method of claim 39 wherein:

transforming comprises applying a two-dimensional Fourier transform.

41. The method of claim 39 wherein:

the model is the product of the analysis portion of an adaptive analysis/synthesis methodology and the input to the model is a subset of a holographic representation of the image.

42. The method of claim 39 wherein: the adaptive analysis/synthesis prediction methodology comprises linear prediction.

43. The method of claim 39 wherein the subset of the holographic representation is less than all the holographic representation.

44. The method of claim 42 wherein the subset comprises a plurality of complete rows of the holographic representation.

45. The method of claim 39 wherein the transform is to a frequency domain and the subset is chosen to be substantially symmetric about 0 Hz.

46. The method of claim 39 wherein synthesizing comprises use of white noise as an excitation source.

47. The method of claim 46 wherein synthesizing further comprises averaging the results of a plurality of reconstituted images, each based on an independent excitation using white noise.

48. The A computer program product, comprising a computer readable medium having a computer readable program code embodied therein, the computer readable program code adapted to be executed to implement a method for decompressing a compressed representation of an image, the compressed representation comprising parameters of a model of the image, the method comprising:

providing a system comprising a synthesis module; transforming pixel intensity data of an image to a holographic representation of the image by applying a Fourier transform and synthesizing by the synthesis module, a holographic representation of the image from the model without phase information, and transforming the synthesized holographic representation to at least a set of pixel intensity data of the image;

wherein:

the compressed representation further comprises an error between the model and the input data to the model; and synthesizing further comprises use of the error as an excitation source.

\* \* \* \* \*

UNITED STATES PATENT AND TRADEMARK OFFICE
CERTIFICATE OF CORRECTION

PATENT NO. : 7,653,248 B1
APPLICATION NO. : 11/267177
DATED : January 26, 2010
INVENTOR(S) : Witzgall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Twenty-eighth Day of December, 2010

David J. Kappos
*Director of the United States Patent and Trademark Office*